US008187404B2

(12) United States Patent
Ohta et al.

(10) Patent No.: US 8,187,404 B2
(45) Date of Patent: May 29, 2012

(54) METHOD OF MAKING A PLATE-SHAPED PEELING MEMBER

(75) Inventors: Yukio Ohta, Mie (JP); Satoru Fukuzawa, Mie (JP); Masaki Ohashi, Mie (JP); Kazuo Hirose, Mie (JP)

(73) Assignees: NTN Corporation, Osaka (JP); Seed Corporation, Mie (JP)

( * ) Notice: Subject to any disclaimer, the term of this patent is extended or adjusted under 35 U.S.C. 154(b) by 938 days.

(21) Appl. No.: 12/218,093

(22) Filed: Jul. 11, 2008

(65) Prior Publication Data

US 2008/0276440 A1 Nov. 13, 2008

Related U.S. Application Data

(62) Division of application No. 10/996,794, filed on Nov. 24, 2004, now Pat. No. 7,415,233.

(30) Foreign Application Priority Data

Nov. 27, 2003 (JP) ................................ 2003-397116

(51) Int. Cl.
*B32B 3/04* (2006.01)

(52) U.S. Cl. ......... 156/216; 156/223; 156/248; 156/249

(58) Field of Classification Search ........................ None
See application file for complete search history.

(56) References Cited

U.S. PATENT DOCUMENTS 4,144,110 A 3/1979 Luc
5,441,811 A 8/1995 Lin et al.
5,527,420 A * 6/1996 Mauduit et al. ............... 156/465
6,236,829 B1 5/2001 Uehara et al.
6,571,983 B1 * 6/2003 Schumann et al. ............ 221/25
2002/0031648 A1 3/2002 Ohashi
2003/0210933 A1 11/2003 Mouri et al.
2005/0254865 A1 11/2005 Katayanagi
2006/0037693 A1 * 2/2006 Wade ........................... 156/234

FOREIGN PATENT DOCUMENTS

JP 10-90554 4/1998
JP 11-184300 7/1999
JP 2001-235959 8/2001
JP 2003-122174 4/2003

* cited by examiner

*Primary Examiner* — John L. Goff
*Assistant Examiner* — Barbara J. Musser
(74) *Attorney, Agent, or Firm* — Hedman & Costigan, P.C.; James V. Costigan

(57) ABSTRACT

A method for manufacturing a plate-shaped peeling member having a thin metal plate and a resin sheet adhered thereto by wrapping the resin sheet around a leading edge of the thin metal plate. The plate-shaped peeling member peels paper from a roller or a belt of an electrophotographic apparatus, with a leading edge of the thin metal plate in contact with or being adjacent to the roller or the belt. The method includes the step of stacking an adhesive agent-applied resin sheet to one main surface of a thin metal plate without pulling both end portions of the adhesive agent-applied resin sheet in a longitudinal direction thereof, with an unstuck portion left on the adhesive agent-applied resin sheet in a widthwise direction thereof and with the adhesive agent-applied resin sheet being pressurized in a longitudinal direction thereof.

4 Claims, 6 Drawing Sheets

METHOD OF MAKING A PLATE-SHAPED PEELING MEMBER

This application is a divisional application of Ser. No. 10/996,794, now U.S. Pat. No. 7,415,233 filed Nov. 24, 2004, which claims priority from Japanese Application. Serial No. 2003-397116, filed Nov. 27, 2003.

BACKGROUND OF THE INVENTION

The present invention relates to a plate-shaped peeling member for peeling paper from fixing members such as a fixing roller, a fixing belt, and the like installed in an electrophotographic apparatus such as a copy machine and a laser beam printer and a method and an apparatus for manufacturing the plate-shaped peeling member.

Electrophotographic apparatuses such as a copy machine and a laser beam printer includes a heating/fixing apparatus for developing electrostatic latent images formed on a photosensitive drum on paper with a developer such as toner, and then fixing them. The heating/fixing apparatus has a fixing member such as a fixing roller and a fixing belt for fusing the developer by heating it and pressurizing the developer.

Conventionally, separation pawls for smoothly peeling developer-fixed paper from the roller or the like are disposed on the fixing member and on a pressurizing roller for pressing paper against the fixing member. In recent years, there is a tendency for the plate-shaped peeling member capable of accomplishing a line contact with the roller and the belt to be used instead of the separation pawl.

For example, in the peeling plate disclosed in Japanese Laid-Open Patent Publication No. 2001-235959, through the silicone based adhesive agent, the fluororesin sheet is stuck to the portion of the metal plate which contacts or is proximate to the fixing member such as the fixing roller and the fixing belt. The peeling plate has excellent paper-peeling property, durability against high temperature, and anti-tacking property to toner.

The plate-shaped peeling member is disclosed in Japanese Laid-Open Patent Publication No. 2003-122174. The plate-shaped peeling member has the base member and the fluororesin sheet stuck thereto. To obtain the plate-shaped peeling member in which the generation of wrinkles and bubbles in the fluororesin sheet is suppressed to a possible highest extent, the edge forming the one side of the flat plate-shaped base material and its periphery are sandwiched by the fluororesin sheet in such a way that the fluororesin sheet is rolled on the edge forming the one side of the flat plate-shaped base material and the pulling portion is provided at both ends of the edge forming the one side of the flat plate-shaped base material. Further by pulling both ends of a pulling portion, the portion of the base material sandwiched by the upper and lower portion of the fluororesin sheet is pressurized, with a tensile force being applied to the fluororesin sheet. In the above-described manner, the fluororesin sheet is stuck to the base material.

However, in the plate-shaped peeling member obtained by the above-described method, the fluororesin sheet is stuck to the base material, with a tensile force being applied to the fluororesin sheet. Thus when the adhesive force deteriorates because the plate-shaped peeling member is used for a long time, the fluororesin sheet contracts and toner is attached to an exposed adhesive agent. Thus paper is stained.

SUMMARY OF THE INVENTION

It is an object of the present invention to provide a plate-shaped peeling member which can be used for a long time and is manufactured by a method which is superior in productivity and capable of manufacturing plate-shaped peeling members not having variations in quality.

The present invention provides a plate-shaped peeling member having a thin metal plate and a resin sheet adhered thereto by winding the resin sheet around a leading edge of the thin metal plate. The plate-shaped peeling member peels paper from a roller or a belt of an electrophotographic apparatus, with a leading edge of the thin metal plate in contact with or being adjacent to the roller or the belt. In the plate-shaped peeling member, the adhesive agent-applied resin sheet is stuck to the thin metal plate in a length a little shorter than that of the thin metal plate in a longitudinal direction thereof without pulling both end portions of the adhesive agent-applied resin sheet in a longitudinal direction thereof, with a metal ground exposed at both end surfaces of the thin metal plate in the longitudinal direction thereof.

The present invention provides a method for manufacturing a plate-shaped peeling member having a thin metal plate and a resin sheet adhered thereto by winding the resin sheet around a leading edge of the thin metal plate. The plate-shaped peeling member peels paper from a roller or a belt of an electrophotographic apparatus, with a leading edge of the thin metal plate in contact with or being adjacent to the roller or the belt.

The method includes the steps of sticking an adhesive agent-applied resin sheet to one main surface of a thin metal plate without pulling both end portions of the adhesive agent-applied resin sheet in a longitudinal direction thereof, with an unstuck portion left on the adhesive agent-applied resin sheet in a widthwise direction thereof and with the adhesive agent-applied resin sheet being pressurized in a longitudinal direction thereof; temporarily sticking the unstuck portion left on the adhesive agent-applied resin sheet in the widthwise direction thereof to other main surface thereof by folding back the unstuck portion along a leading edge of the thin metal plate toward the other main surface thereof without pulling the both end portions of the adhesive agent-applied resin sheet in the longitudinal direction thereof; and fixing the temporarily unstuck portion of the adhesive agent-applied resin sheet to the other main surface of the thin metal plate, while the unstuck portion is being pressurized in the longitudinal direction of the adhesive agent-applied resin sheet from approximately a center of the adhesive agent-applied resin sheet in the longitudinal direction thereof.

The apparatus of the present invention for manufacturing a plate-shaped peeling member as claimed in claim 1 including a first means for taking out a resin sheet-including product from a placing base after an operation of a fourth means finishes and mounting a thin metal plate joined with a supporting member or the thin metal plate on the placing base; a second means for sticking an adhesive agent-applied resin sheet to one main surface of a thin metal plate without pulling both end portions of an adhesive agent-applied resin sheet in a longitudinal direction thereof, with an unstuck portion left at an end portion of the adhesive agent-applied resin sheet in a widthwise direction thereof and with the adhesive agent-applied resin sheet being pressurized in a longitudinal direction thereof; a third means for temporarily sticking the unstuck portion left on the adhesive agent-applied resin sheet in the widthwise direction thereof to other main surface thereof by folding back the unstuck portion along a leading edge of the thin metal plate toward the other main surface thereof without pulling the both end portions of the adhesive agent-applied resin sheet in the longitudinal direction thereof; and a fourth means for fixing the temporarily unstuck portion of the adhesive agent-applied resin sheet to the other main surface of the thin metal plate, while the unstuck portion is being pressurized in the longitudinal direction of the adhesive agent-applied resin sheet from approximately a center of the adhesive agent-applied resin sheet in the longitudinal direction thereof.

In the manufacturing apparatus, the first through fourth means are so disposed as to surround four sides of a square stand respectively. In the manufacturing apparatus, a rotary body having sides corresponding to the four sides of the square stand respectively is mounted on the square stand. When the rotary body rotates 90 degrees, operations of the first through fourth means are sequentially performed.

In the plate-shaped peeling member of the present invention, both ends of the adhesive agent-applied resin sheet in its longitudinal direction are not pulled in sticking the adhesive agent-applied resin sheet to the thin metal plate. Therefore the resin sheet does not contract. Even when the adhesive force deteriorates, the resin sheet does not contract. Thus it is possible to prevent toner from polluting paper for a long time. The adhesive agent-applied resin sheet is stuck to the thin metal plate in a length a little shorter than that of the thin metal plate in a longitudinal direction thereof, with the metal ground exposed at both end surfaces of the thin metal plate in the longitudinal direction thereof. Therefore the adhesive agent does not stick out or is not exposed. Thus it is possible to prevent toner from polluting paper.

Since the method of manufacturing the plate-shaped peeling member of the present invention has the above-described processes, the method is capable of suppressing the generation of wrinkles and bubbles in the resin sheet to a possible highest extent.

The apparatus for manufacturing the plate-shaped peeling member has the first means, the second means, the third means, and the fourth means so disposed as to surround the four sides of the square stand respectively. Therefore the apparatus is capable of manufacturing the plate-shaped peeling member at a high efficiency even in a small space. Hence the apparatus has a high productivity.

DETAILED DESCRIPTION OF THE PREFERRED EMBODIMENTS

Figure 1A:
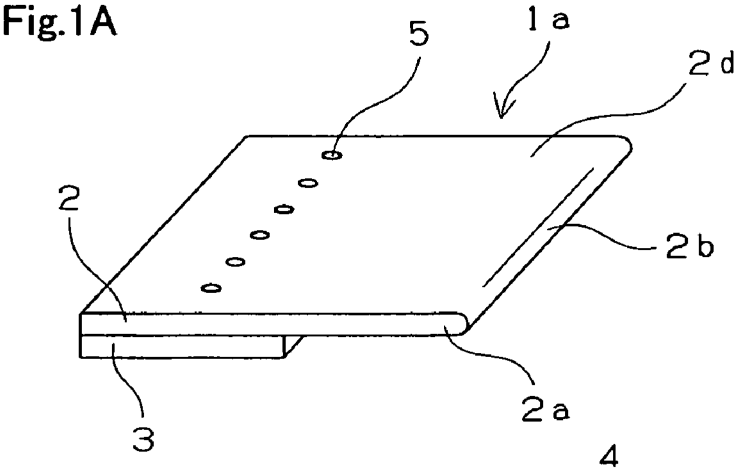
FIG. 1A, FIG. 1B, FIG. 1C and FIG. 1D show the process of manufacturing a plate-shaped peeling member of the present invention.

The method for manufacturing a plate-shaped peeling member of the present invention is described below with reference to FIG. 1A, FIG. 1B, FIG. 1C and FIG. 1D. FIG. 1A to FIG. 1D show the process of manufacturing the plate-shaped peeling member.

In a plate-shaped peeling member 1, except a free end portion 2*a* of a thin metal plate 2, the thin metal plate 2 is joined with a supporting member 3 by laser spot welding. A resin sheet 4 is stuck to upper and lower surfaces of the free end portion 2*a* by winding the resin sheet 4 around a leading edge 2*b* forming one side of the thin metal plate 2 from the upper surface of the free end portion 2*a* toward the lower surface thereof. Reference numeral 5 denotes a trace formed by laser spot welding.

Examples of a material of the thin metal plate include iron, aluminum, copper, stainless steel and the like. Preferably, the metal plate has a thickness within the range of 50 to 300 μm. If the thickness of the metal plate is less than 50 μm, it cannot provide sufficient pressure welding to the roller to ensure peeling ability. If the thickness exceeds 300 μm, the paper to be peeled may bump against the tip of the plate-shaped peeling member 1, which may cause jamming.

The thin metal plate 2 is joined with the supporting member 3 by laser spot welding. It is preferable that a plurality of spots be formed in parallel with a side contacted or adjacent with/to the roller in order to suppress waving of the thin metal plate 2. Also, it is preferable that the space between the spots be narrow as long as the laser spot welding can be conducted. Specifically, when the plate-shaped peeling member having a length of about 300 mm in its longitudinal direction is used, the space between the spots is preferably about 10 mm.

A base material 1*a* having the thin metal plate 2 joined with the supporting member 3 by the laser spot welding is prepared (see FIG. 1A).

Figure 1B:
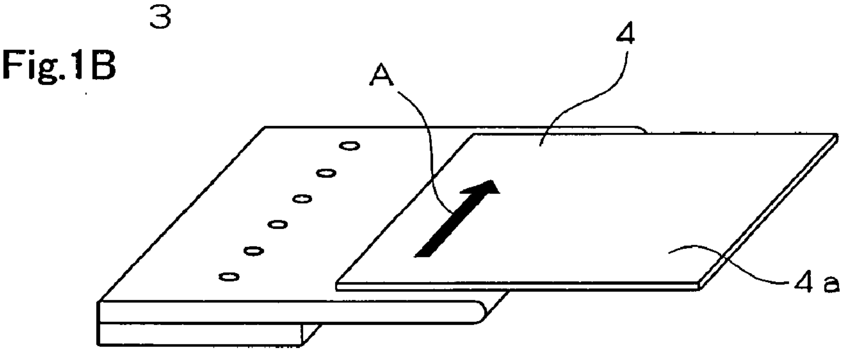

Thereafter the adhesive agent-applied resin sheet 4 shorter than the length of one main surface 2*d* of the thin metal plate 2 in its longitudinal direction A is stuck to the one main surface 2*d* by applying a pressure to the adhesive agent-applied resin sheet 4 in the longitudinal direction A, while an operator is performing an operation of bonding an adhesive layer of the adhesive agent-applied resin sheet to the one main surface 2*d* and not bonding a portion (unstuck portion) 4*a* of the adhesive agent-applied resin sheet 4 to the thin metal plate 2 (see FIG. 1B).

As the resin sheet, a fluororesin sheet is preferable because it has excellent anti-tacking property to the developer. As the fluororesin sheet, it is preferable to use a sheet made of at least one resin selected from the group consisting of polytetrafluoroethylene polymer (hereinafter referred to as "PTFE"), tetrafluoroethylene-perfluoroalkylvinylether copolymer, tetrafluoroethylene-hexafluoropropylene copolymer, and tetrafluoroethylene-ethylene copolymer.

Among the fluororesin sheet described above, the sheet composed of the PTFE is suitable for use in the plate-shaped peeling member of the present invention, since the sheet composed of the PTFE has excellent anti-tacking property to the developer and sufficient heat-resistance.

It is preferable to treat the surface of the fluororesin sheet which is stuck to the thin metal plate. The "surface treatment" herein is a treatment to improve adhesion effectiveness, when the fluororesin sheet is bonded to the thin metal plate with a silicone based adhesive described later. It is possible to use corona discharge, sputter etching, plasma etching, TOS treatment with metal sodium, and ultraviolet ray irradiation.

The fluororesin sheet has preferably a thickness in the range of 10 to 200 μm, more preferably in the range of 40 to 80 μm. If the thickness of the fluororesin sheet is less than 10 μm, the sheet may be broken by abrasion with the developer, and the thin metal plate may be exposed by slight wearing. Also, the sheet may be crumpled at a step of sticking it to the thin metal plate, and may be handled with difficulty. If the thickness exceeds 200 μm, paper peeling ability decreases.

FIG. 2A, FIG. 2B, FIG. 2C and FIG. 2D show the sticking process shown in FIG. 1B. FIG. 2A to FIG. 2D are sectional views showing the process at the time when the resin sheet 4 is stuck to the thin metal plate 2.

Figure 2A:
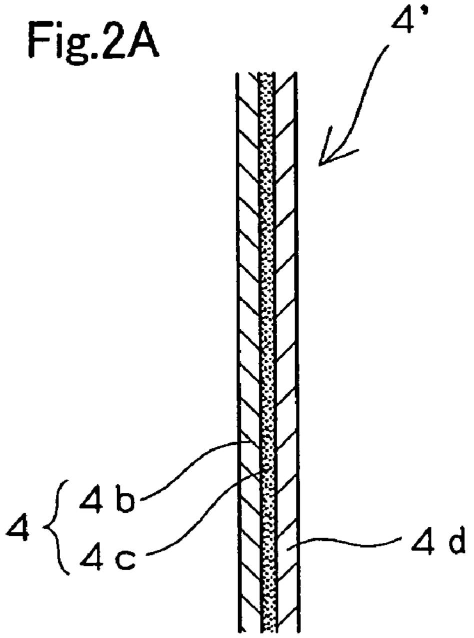
FIG. 2A, FIG. 2B, FIG. 2C and FIG. 2D are sectional views showing the process of sticking a resin sheet to a thin metal plate.
Figure 2B:
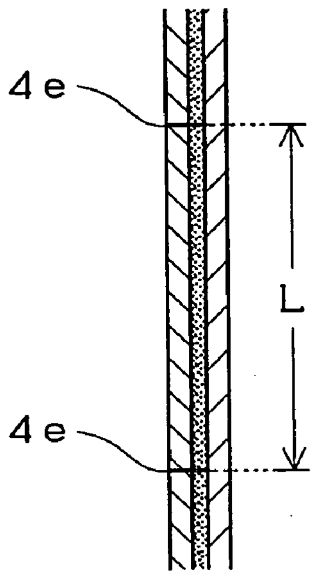
Figure 2C:
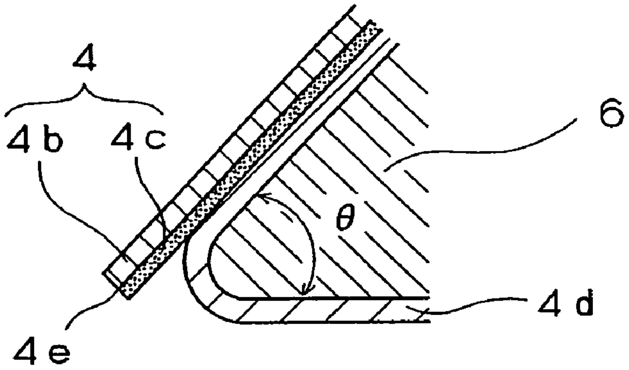
Figure 6:
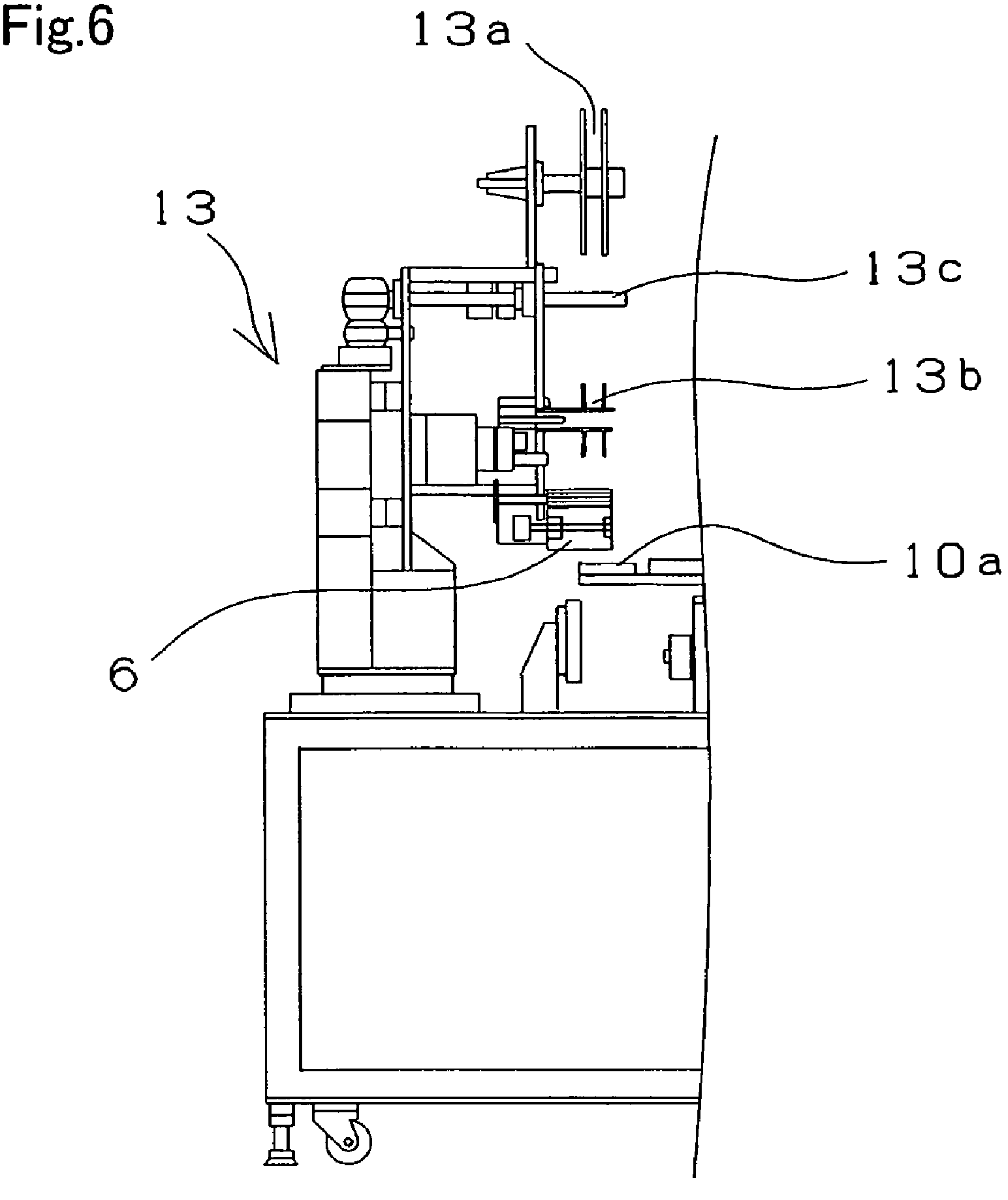
FIG. 6 shows a second means of the apparatus shown in FIG. 5.

Before the adhesive agent-applied resin sheet 4 is stuck to the thin metal plate 2, the adhesive agent-applied resin sheet 4 is wound around a tape supply reel 13*a* shown in FIG. 6 as a composite tape 4' (see FIG. 2A and FIG. 6). The composite tape 4' includes a resin sheet portion 4*b*, an adhesive layer 4*c*, and a peeling paper 4*d* sequentially layered one upon another. The composite tape 4' is wound around the tape supply reel 13*a* with the peeling paper 4*d* disposed on the innermost layer of the composite tape 4'. The resin sheet portion 4*b* is bonded to the thin metal plate 2 through the adhesive layer 4*c*, while the peeling paper 4*d* is being separated from the adhesive layer 4*c*.

Nicks 4*e* are formed in the resin sheet portion 4*b* of the composite tape 4' and the adhesive layer 4*c* thereof. The length between the adjacent nicks 4*e* is set a little shorter than the length of the thin metal plate 2 in its longitudinal direction (see FIG. 2B). At this time, the nick 4*e* is not formed in the peeling paper 4*d*. Therefore the peeling paper 4*d* allows the resin sheet 4 to keep the length L without expanding or contracting the resin sheet 4.

With a pawl member 6 having a predetermined angle θ being pressed against the composite tape 4' in the direction from the side of the peeling paper 4*d*, the composite tape 4' is wound around a winding reel 13*b* shown in FIG. 6 along the leading end of the pawl member 6. At the same time, the resin sheet 4 separates from the nicks 4*e* and also from the peeling paper 4*d*, with the adhesive layer 4*c* of the resin sheet 4 disposed at the side of the thin metal plate 2. The adhesive agent-applied resin sheet 4 separated from the peeling paper 4*d* is stuck to the thin metal plate 2 by moving the pawl member 6 in the direction shown with the arrow A along the surface of the thin metal plate 2, while the peeling paper 4*d* is being wound around the winding reel 13*b*. At the same time, the peeling paper 4*d* is wound around an unshown tape-winding reel (see FIG. 2C). The angle θ at the leading end of the pawl member 6 is set in consideration of the repulsion thereof attributed to the material of the tape or the thickness thereof. Thereby the peeling paper 4*d* can be separated from the composite tape 4'.

Figure 2D:
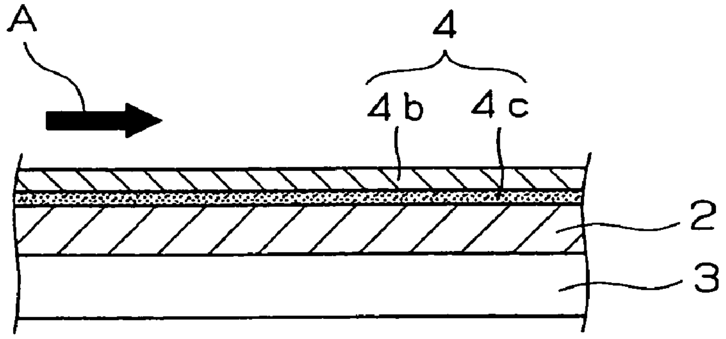

The adhesive layer 4*c* is stuck to the thin metal plate 2 by applying a pressure to the adhesive agent-applied resin sheet 4 in the longitudinal direction A of the thin metal plate 2 (see FIG. 2D). FIG. 2D is a sectional view showing the plate-shaped peeling member seen in the longitudinal direction thereof. In sticking the adhesive layer 4*c* to the thin metal plate 2, the front side of the pawl member 6 having the angle θ moves in the longitudinal direction of the thin metal plate 2. This method allows the peeling paper 4*d* to be separated from the composite tape 4' and the adhesive agent-applied resin sheet 4 to be stuck to the thin metal plate 2 without the resin sheet 4 being pulled. Therefore the adhesive agent-applied resin sheet 4 does not expand or contract, even though the adhesive agent-applied resin sheet 4 is stuck to the thin metal plate 2 by applying a pressure to the adhesive agent-applied resin sheet 4 in the longitudinal direction A.

Figure 1C:
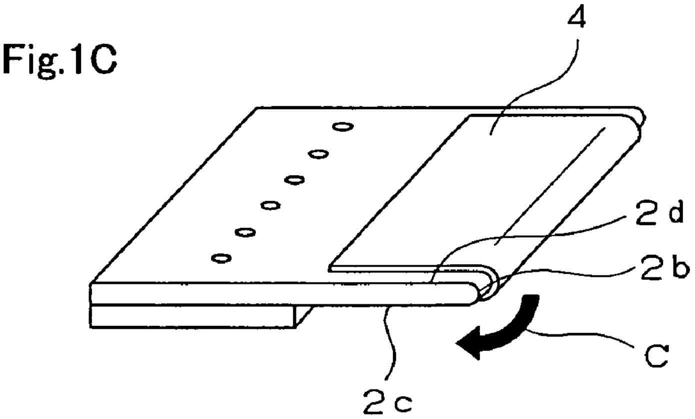

Thereafter the adhesive agent-applied resin sheet 4 is temporarily stuck to the thin metal plate 2 by folding back the unstuck portion 4*a* of the adhesive agent-applied resin sheet 4 along the leading edge 2*b* of the thin metal plate 2 toward other main surface 2*c* (see FIG. 1*c*).

Figure 3A:
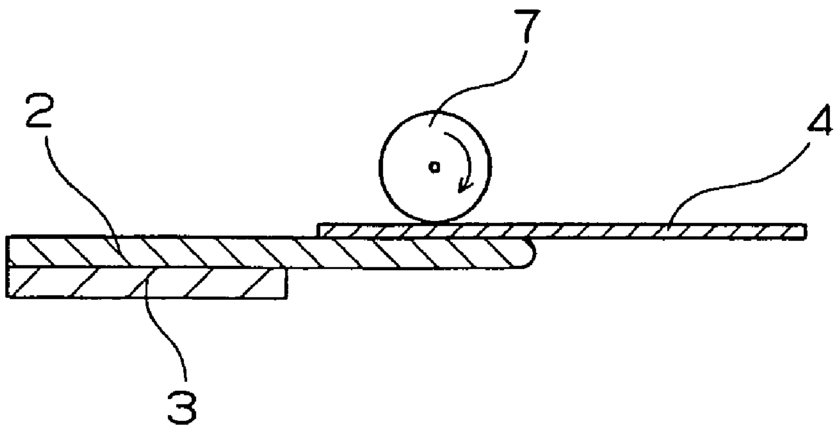
FIG. 3A and FIG. 3B are widthwise sectional views showing the process of temporarily sticking the resin sheet to the thin metal plate.
Figure 3B:
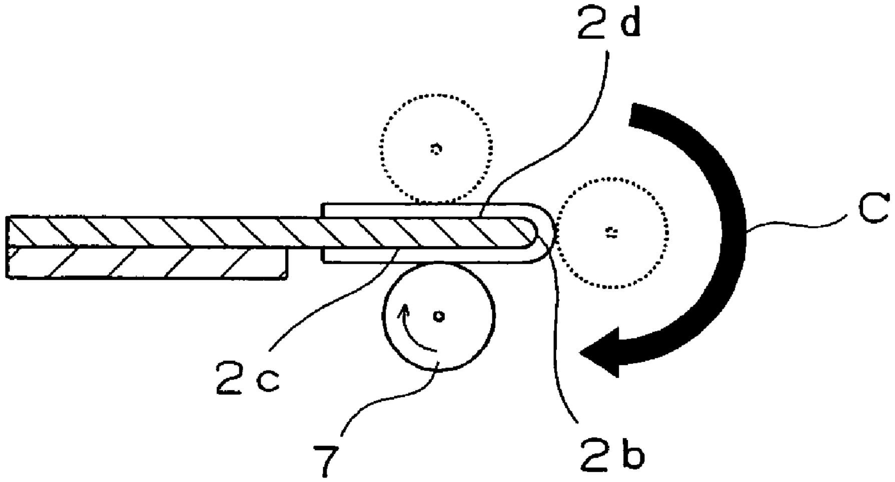

FIG. 3A and FIG. 3B show the temporary sticking process shown in FIG. 1C. FIG. 3A and FIG. 3B are widthwise sectional views showing the process of temporarily sticking the resin sheet to the thin metal plate.

The adhesive agent-applied resin sheet is temporarily stuck to the thin metal plate 2 by using a roller 7 having a shaft parallel with the longitudinal direction of the thin metal plate 2 (see FIG. 3A).

The roller 7 rotates and moves from an upper surface of the adhesive agent-applied resin sheet 4 along the leading edge 2*b* to the other main surface 2*c* of the thin metal plate 2, with the roller 7 being pressed against the adhesive agent-applied resin sheet 4 (see FIG. 3B). As a result, the resin sheet 4 is stuck to the leading edge 2*b* of the thin metal plate 2 and both main surfaces 2*d* and 2*c* thereof.

Figure 1D:
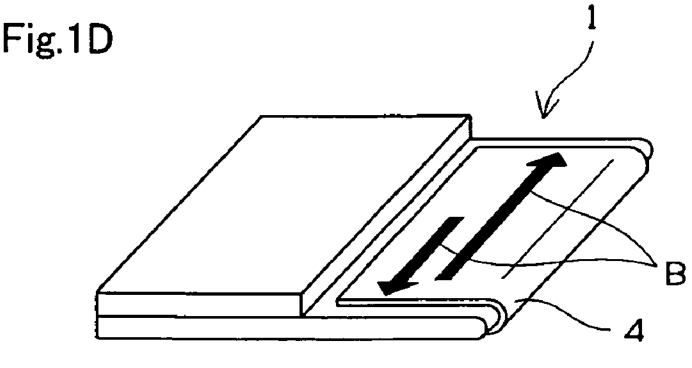

To bond the resin sheet 4 fixedly to the thin metal plate 2 strongly, the other main surface 2*c* to which the unstuck portion 4*a* of the resin sheet 4 has been temporarily stuck is pressurized in the longitudinal direction B of the adhesive agent-applied resin sheet 4 from approximately the center thereof in its longitudinal direction B (see FIG. 1D).

Figure 4:
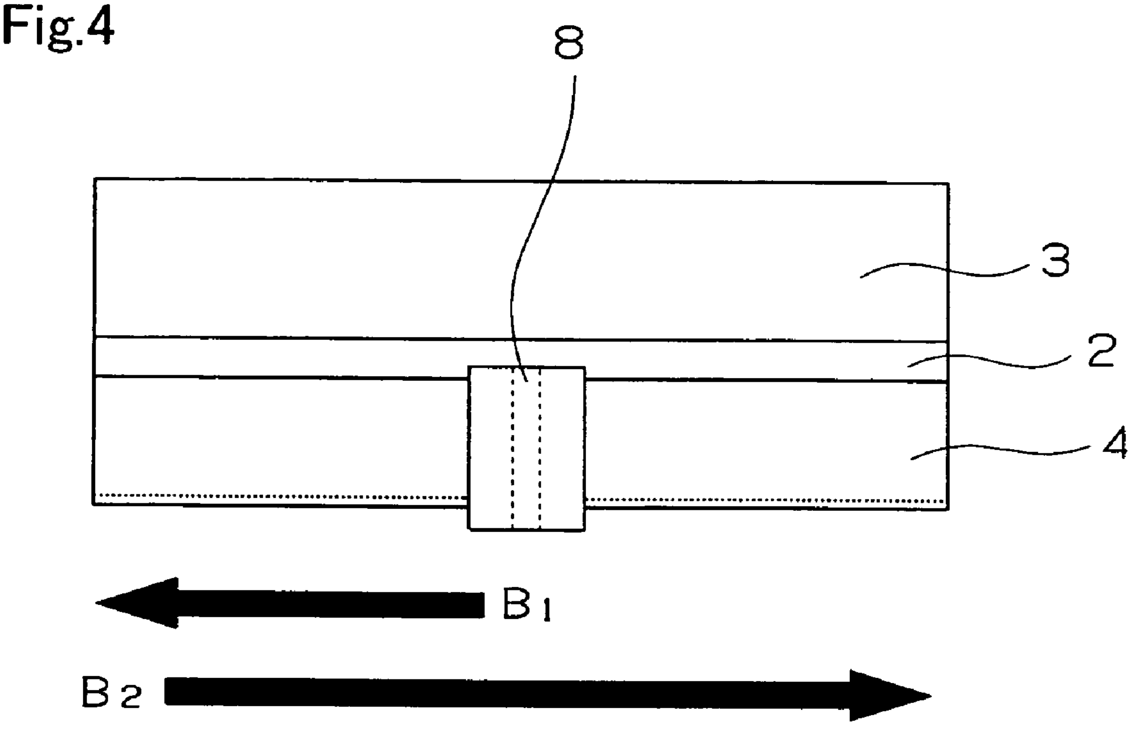
FIG. 4 is a widthwise sectional view showing the process of temporarily sticking the resin sheet to the thin metal plate.

FIG. 4 shows the pressurizing process. FIG. 4 is a sectional view showing the process of temporarily sticking the resin sheet to the thin metal plate when the plate-shaped peeling member is seen from the other main surface 2*c*.

As the pressurizing means, the pressurizing roller 8 is used. The pressurizing roller 8 having a shaft in the widthwise direction of the resin sheet 4 is moved in the longitudinal direction thereof, while the pressurizing roller 8 is rotating. At this time, the pressurizing roller 8 is moved in the direction shown with the arrow $B_1$ from approximately the center of the adhesive agent-applied resin sheet 4 in its longitudinal direction. Thereafter the pressurizing roller 8 is moved in the direction shown with the arrow $B_2$ from one end of the adhesive agent-applied resin sheet 4. This method makes it possible to manufacture the plate-shaped peeling member in which the generation of wrinkles and bubbles in the resin sheet 4 is suppressed to a possible highest extent. The pressurizing roller 8 may be moved in the direction shown with the arrow $B_1$ from approximately the center of the adhesive agent-applied resin sheet 4 in its longitudinal direction and then in the direction shown with the arrow $B_2$ from approximately the center of the adhesive agent-applied resin sheet 4.

When the plate-shaped peeling member 1 not having the supporting member 3 is manufactured, the above-described method allows the adhesive agent-applied resin sheet 4 to be stuck to the thin metal plate 2 from the leading edge 2*b* thereof to the other main surface 2*c* thereof.

In the plate-shaped peeling member 1 obtained by the above-described manufacturing method, the resin sheet 4 is stuck to the thin metal plate 2 by winding the resin sheet 4 around the leading edge 2*b* of the thin metal plate 2. The resin sheet 4 is stuck to the thin metal plate 2 in a length a little shorter than that of the thin metal plate 2 in its longitudinal direction. Therefore a metal ground is exposed at both end surfaces of the thin metal plate 2 in its longitudinal direction. Because both ends of the resin sheet 4 in its longitudinal direction are not pulled in sticking the resin sheet 4 to the thin metal plate 2, the resin sheet 4 stuck to the thin metal plate 2 does not contract in its longitudinal direction. Even when the adhesive force deteriorates or is nonuniform, the resin sheet 4 does not contract. Therefore the adhesive agent is not exposed and hence toner does not attach to the adhesive agent. Thus paper is not stained.

As described above, the plate-shaped peeling member of the present invention is capable of accomplishing a sufficient line contact with a fixing member such as a fixing roller and does not damage it at the portion where the plate-shaped peeling member contacts the fixing member. Further the plate-shaped peeling member is capable of maintaining superior peeling performance for a long time and preventing toner from contaminating paper.

Figure 5:
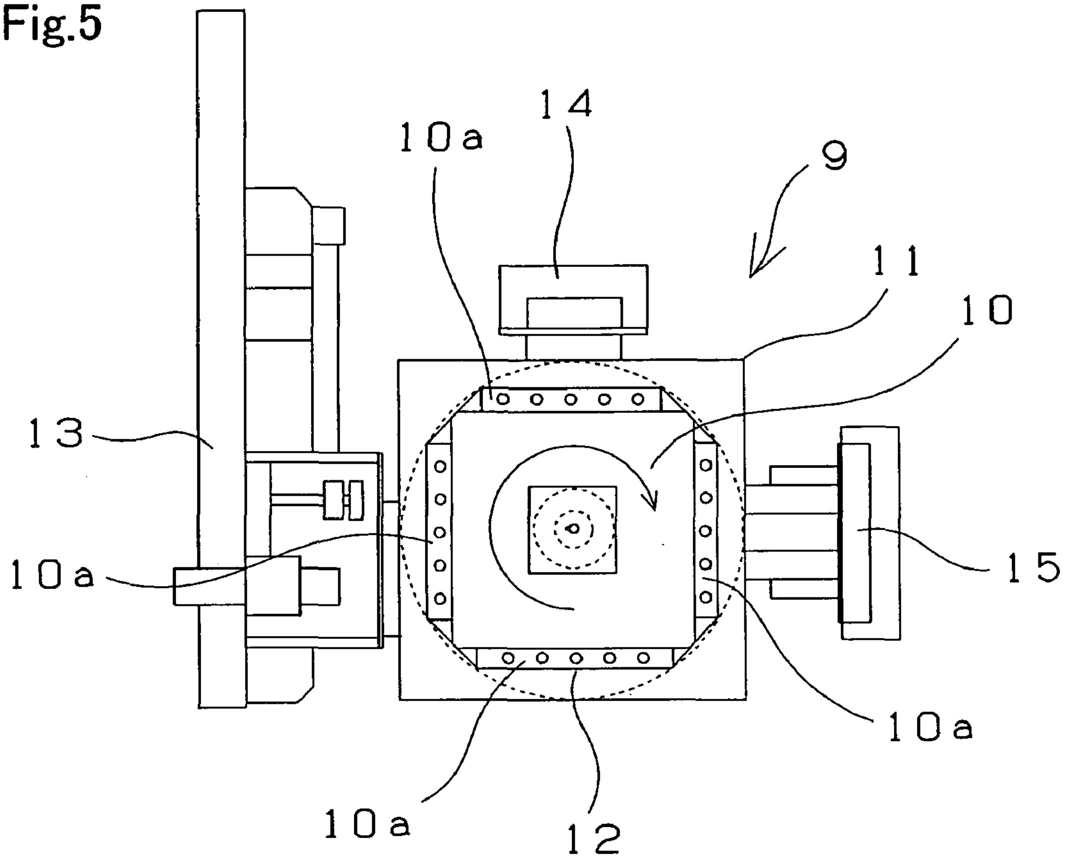
FIG. 5 is a plan view showing an apparatus for manufacturing the plate-shaped peeling member.

An apparatus for manufacturing the plate-shaped peeling member is described below with reference to FIG. 5 and FIG. 6. FIG. 5 is a plan view showing the apparatus for manufacturing the plate-shaped peeling member. FIG. 6 shows a second means of the apparatus for manufacturing the plate-shaped peeling member.

The apparatus for manufacturing the plate-shaped peeling member has a rotary body 10 which is mounted on a square stand 11. A placing base 10*a* for placing the thin metal plate 2 thereon and fixing it thereto is provided on each of four sides thereof. The rotary body 10 rotates 90 degrees at a time.

The apparatus for manufacturing the plate-shaped peeling member has a first means 12, a second means 13, a third means 14, and a fourth means 15 so disposed as to surround the four sides of the square stand 11 respectively.

The first means 12 takes out a product from the placing base 10*a* and mounts the thin metal plate joined with the supporting member 3 or the thin metal plate on the placing base 10*a*. A vacuum suction fixing method or the like can be adopted to mount the thin metal plate or the like on the placing base 10*a*.

The second means 13 carries out the process shown in FIG. 2A to FIG. 2D. The second means 13 has the composite tape 4', the tape supply reel 13*a*, a cutting means 13*c* for cutting the thin metal plate in its longitudinal direction, the pawl member 6 for sticking the resin sheet 4 to the thin metal plate, while it is peeling the peeling paper 4*d*, and the winding reel 13*b*. The second means 13 has a portion for moving the second means 13 in the longitudinal direction of the thin metal plate.

The third means 14 carries out the process shown in FIG. 3A and FIG. 3B. It is possible to use an apparatus as the third means 14, provided that the apparatus is capable of temporarily sticking the adhesive agent-applied resin sheet 4 to the thin metal plate 2 by folding back the unstuck portion 4*a* thereof along the leading edge 2*b* of the thin metal plate 2.

The fourth means 15 carries out the process shown in FIG. 4. It is possible to use an apparatus as the fourth means 15, provided that the apparatus is capable of moving from approximately the center of the adhesive agent-applied resin sheet 4 in its longitudinal direction to apply pressure to the adhesive agent-applied resin sheet 4 in fixedly sticking the adhesive agent-applied resin sheet 4 to the thin metal plate 2.

The plate-shaped peeling member of the present invention is capable of accomplishing a sufficient line contact with a fixing member such as a fixing roller and does not damage it at the portion where the plate-shaped peeling member contacts the fixing member. Further the plate-shaped peeling member is capable of maintaining its superior peeling performance for a long time. That is, the plate-shaped peeling member is durable. Thus the plate-shaped peeling member is applicable to an electrophotographic apparatus such as a copy machine and a laser beam printer Since the method of manufacturing the plate-shaped peeling member of the present invention has the above-described processes, the method is capable of suppressing the generation of wrinkles and bubbles in the resin sheet and enhancing smoothness on the upper and lower surfaces of the plate-shaped peeling member. Consequently the method can be used to manufacture the plate-shaped peeling member for the electrophotographic apparatus capable of securely keeping the quality of a recorded image high.

What is claimed is:

1. A method of manufacturing a plate-shaped peeling member for peeling paper from a roll or a belt of an electrophotographic apparatus, with a leading end of said plate-shaped peeling member in contact with or adjacent to said roller or said belt, comprising:

a thin metal plate having one main surface and an other main surface; and an adhesive agent-applied resin sheet adhered to said thin metal plate by wrapping said resin sheet around leading edge of said thin metal plate;

said method comprising the steps of:

sticking the adhesive agent-applied resin sheet to said one main surface of a said thin metal plate without puling both end portions of said adhesive agent-applied resin sheet in a longitudinal direction thereof, with an unstuck portion left on said adhesive agent-applied resin sheet in a widthwise direction thereof and said adhesive agent applied resin sheet being pressurized in a longitudinal direction thereof;

temporarily sticking said unstuck portion left on said adhesive agent-applied resin sheet in said widthwise direction thereof to said other main surface thereof to form a temporarily stuck portion by folding back said unstuck portion along a leading edge of said thin metal plate toward said other main surface thereof without pulling said both end portions of said adhesive agent-applied resin sheet in said longitudinal direction thereof; and fixing said temporarily stuck portion of said adhesive agent-applied resin sheet to said other main surface of said thin metal plate, while said temporarily stuck portion is being pressurized in said longitudinal direction of said adhesive agent-applied resin sheet from approximately a center of said temporarily sticking step, while said unstuck portion of said adhesive agent-applied resin sheet being wrapped around said leading edge of said thin metal plate toward said other main surface, said adhesive agent-applied resin sheet is temporarily stuck to said other main surface of said thin metal plate by using a roller having a shaft parallel with a longitudinal direction of said thin metal plate.

2. Method as claimed in claim 1, wherein said adhesive agent-applied resin sheet has a resin sheet portion, an adhesive layer, and peeling paper layered sequentially one upon another, before said adhesive agent-applied resin sheet is stuck to said thin metal plate.

3. A method as claimed in claim 2, wherein at said sticking step, nicks are formed in said resin sheet portion of said adhesive agent-applied resin sheet and said adhesive layer thereof; and after said adhesive agent-applied resin sheet is wrapped around a leading end of a pawl member having a predetermined angle, with said pawl member having a predetermined angle being pressed against said adhesive agent-applied resin sheet in a direction from a side of said peeling paper, said adhesive agent-applied resin sheet separates from said nicks in a longitudinal direction thereof and is stuck to said thin metal plate, with said peeling paper separating from said resin sheet portion and said adhesive layer.

4. A method as claimed in claim 1, wherein at said fixing step, after said other main surface to which said unstuck portion of said adhesive agent-applied resin sheet has temporarily stuck is pressurized by moving a pressurizing means in said longitudinal direction of said adhesive agent-applied resin sheet from approximately a center of said adhesive agent-applied resin sheet in said longitudinal direction thereof, said other main surface is pressurized by moving said pressurizing means in a direction opposite to a direction of said movement of said pressurizing means.

* * * * *